US 11,370,339 B2

(12) United States Patent
Ketels et al.

(10) Patent No.: US 11,370,339 B2
(45) Date of Patent: Jun. 28, 2022

(54) VEHICLE CONSOLE WITH MODULAR ACCESSORIES

(71) Applicant: Faurecia Interior Systems, Inc., Auburn Hills, MI (US)

(72) Inventors: Cedric Ketels, Mountain View, CA (US); Thomas Dessapt, Sunnyvale, CA (US); Davide Di Censo, Sunnyvale, CA (US); Abdelkarim Chaiblaine, San Francisco, CA (US); Andreos Kaplanov, Sunnyvale, CA (US); Robert Fitzpatrick, Holland, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 93 days.

(21) Appl. No.: 16/807,894

(22) Filed: Mar. 3, 2020

(65) Prior Publication Data
US 2021/0276466 A1 Sep. 9, 2021

(51) Int. Cl.
*B60N 3/00* (2006.01)
*B60N 2/75* (2018.01)

(52) U.S. Cl.
CPC ............. *B60N 2/79* (2018.02); *B60N 2/787* (2018.02); *B60N 3/00* (2013.01)

(58) Field of Classification Search
CPC ............ B60N 2/79; B60N 2/787; B60N 3/00
USPC ...................................................... 296/37.15
See application file for complete search history.

(56) References Cited

U.S. PATENT DOCUMENTS

| 2,633,180 | A | * | 3/1953 | Reed | B60N 2/793 312/235.6 |
|---|---|---|---|---|---|
| 2,642,926 | A | * | 6/1953 | Diamond | B60N 2/787 297/411.25 |
| 2,691,408 | A | * | 10/1954 | Beard | B60N 2/787 297/411.25 |
| 2,692,638 | A | * | 10/1954 | Castell | B60N 2/787 312/235.6 |
| 3,068,048 | A | * | 12/1962 | Mahon | B60N 2/793 297/188.15 |
| 3,118,704 | A | * | 1/1964 | Meserve | B60N 2/787 312/235.6 |
| 3,140,895 | A | * | 7/1964 | Straumann | B60N 2/787 312/235.6 |
| 4,938,401 | A | * | 7/1990 | Weisbrodt | B60R 7/043 108/44 |
| 5,542,589 | A | * | 8/1996 | McKee | B60R 11/0241 224/275 |

(Continued)

FOREIGN PATENT DOCUMENTS

| DE | 102004055635 A1 | * | 6/2006 | ............. B60N 3/102 |
| DE | 102015220503 A1 | | 4/2017 | |
| JP | 60255543 A | * | 12/1985 | ......... B60R 16/0315 |

OTHER PUBLICATIONS

Machine translation of JP 543 (Year: 1985).*

*Primary Examiner* — Hilary L Gutman
(74) *Attorney, Agent, or Firm* — Reising Ethington P.C.

(57) ABSTRACT

A removable console for use in a row of vehicle seating includes a base and receptacles formed along the base. One of a plurality of interchangeable and accessory modules can be attached to the console base in each receptacle and optionally powered by the console base when installed. A latch holds each installed accessory module in the respective receptacle. Each latch can include electrical contacts to power an installed module.

20 Claims, 3 Drawing Sheets

(56) References Cited

U.S. PATENT DOCUMENTS

| | | | |
|---|---|---|---|
| 7,029,048 B1 | 4/2006 | Hicks et al. | |
| 11,148,602 B2* | 10/2021 | Ahlning | B60N 2/01 |
| 2004/0227372 A1* | 11/2004 | Lavelle | B60N 2/64 |
| | | | 296/37.15 |
| 2005/0035618 A1 | 2/2005 | Toth et al. | |
| 2006/0022478 A1* | 2/2006 | DeLong | B60N 2/79 |
| | | | 296/37.8 |
| 2007/0069541 A1* | 3/2007 | Sturt | B60R 7/04 |
| | | | 296/24.34 |
| 2008/0303302 A1* | 12/2008 | Sturt | B60R 7/04 |
| | | | 296/24.34 |
| 2012/0074741 A1 | 3/2012 | Andersson | |
| 2018/0281637 A1* | 10/2018 | Ott | B60N 2/787 |

* cited by examiner

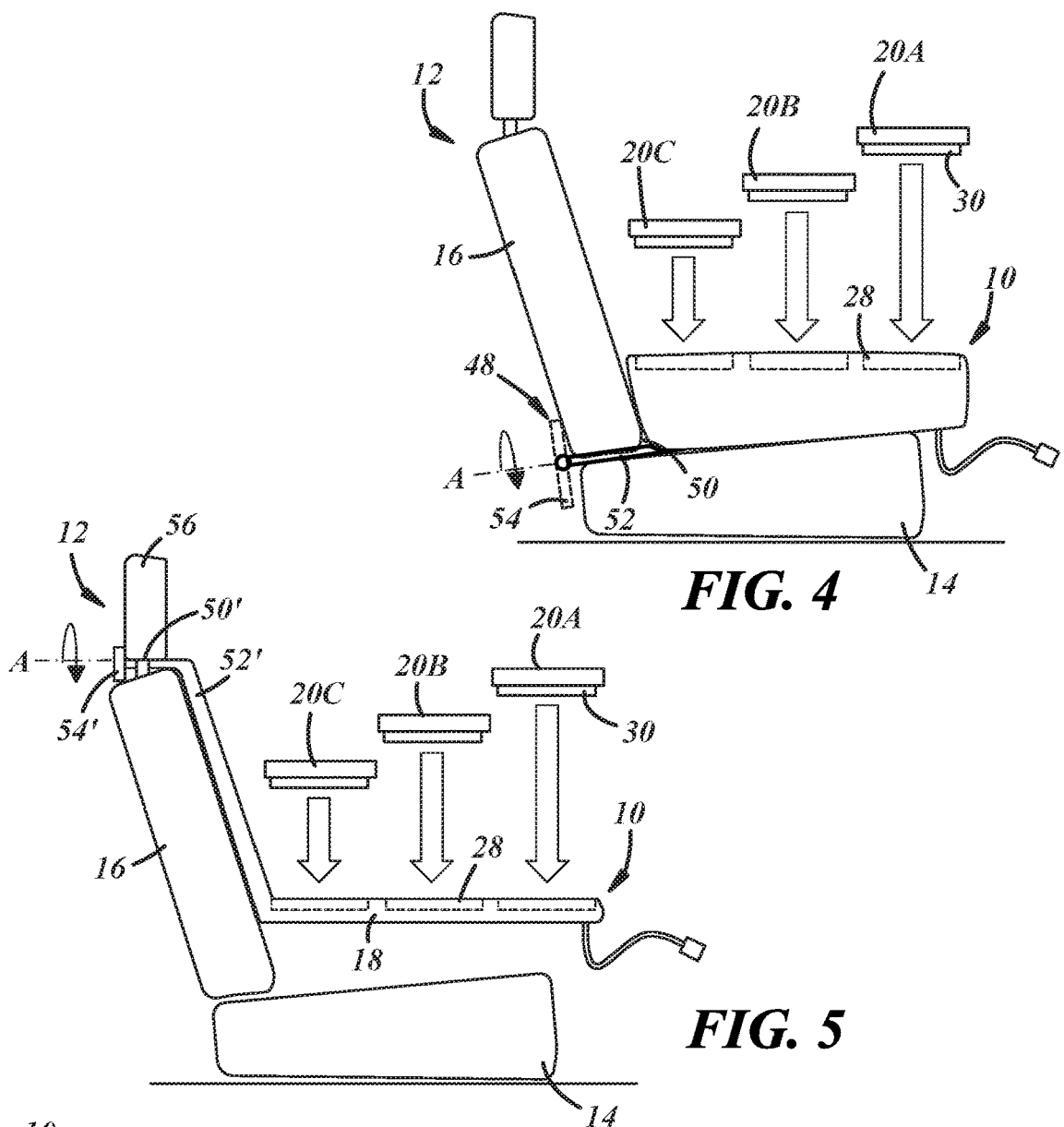
FIG. 4
FIG. 5
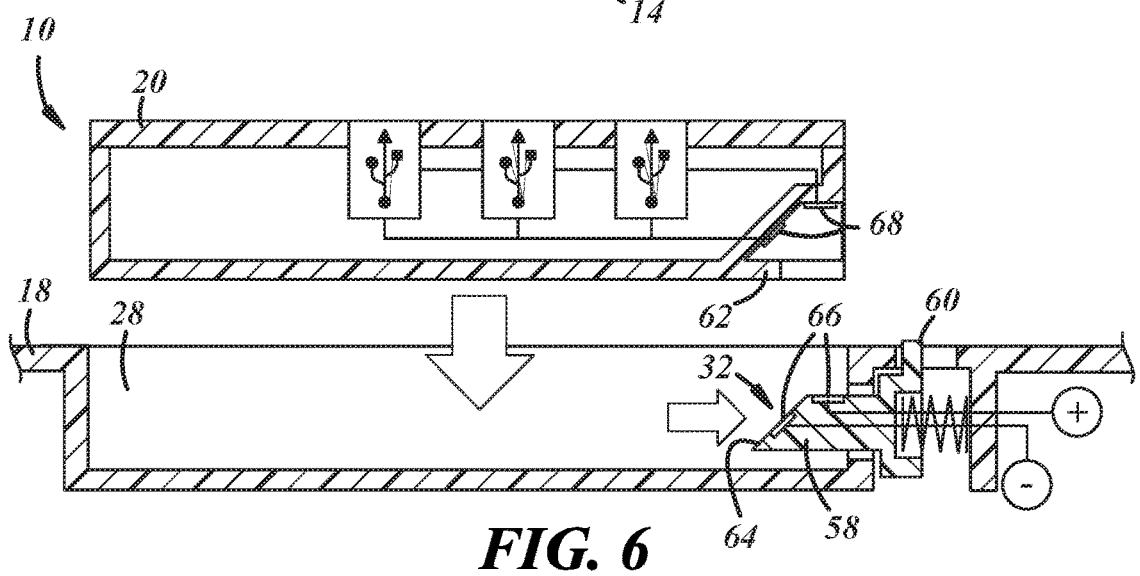
FIG. 6

VEHICLE CONSOLE WITH MODULAR ACCESSORIES

TECHNICAL FIELD

The present disclosure is related generally to vehicle interiors and, more particularly, to vehicle interior components with changeable functionality.

BACKGROUND

Vehicle consoles are commonly employed adjacent individual seats in a vehicle passenger cabin, such as between driver and passenger seats in a front row of seating or between passenger seats in another row of seating. Such consoles can provide armrests or other conveniences for vehicle occupants.

In one example, U.S. Patent Application No. 2005/0035618 by Toth et al. describes a center console for use between front bucket-style seats of a vehicle. The console consists of a base tray that attaches to the floor of the vehicle, along with upright members at the corners of the base tray. The resulting framework is said to support a variety of different storage modules consisting of different shapes and sizes of bins. While recognizing the need for vehicle occupants to plug-in electrically powered items, and providing a power socket on the console to accommodate this need, Toth fails to recognize the utility of any modules that are powered via connection to the base tray or uprights.

SUMMARY

An illustrative console for use in a passenger cabin of a vehicle includes a console base, a receptacle formed along the console base, and a power transmitter. The console base is configured for removable attachment to the vehicle in the passenger cabin, and the receptacle is configured for removable attachment of a plurality of interchangeable accessory modules. The power transmitter provides electrical power from a power source to an installed one of the accessory modules. At least one accessory module has a power receiver for receiving electrical power from the power source when installed in the receptacle.

In various embodiments, the console includes a latch that holds an installed one of the accessory modules in the receptacle and an actuator that moves the latch to permit the installed accessory module to be removed.

In various embodiments, the latch is biased toward a position that holds the installed accessory module in the receptacle.

In various embodiments, the latch is located along the receptacle.

In various embodiments, the power transmitter is located along the latch.

In various embodiments, the console includes a power connector configured for electrical coupling with a vehicle power source to provide electrical power at the power transmitter.

In various embodiments, the console base is supported by a vehicle seat when attached to the vehicle.

In various embodiments, the console base is attached to the vehicle by a fastener extending through a bite line of the vehicle seat.

In various embodiments, the console attaches to the vehicle such that a backrest of a vehicle seat supports the console over a seat bottom of the vehicle seat.

In various embodiments, the console includes an attachment arm extending from the console base. The attachment arm is configured to extend along the backrest and over a top end of the backrest to attach the console to the vehicle seat.

In various embodiments, each accessory module is held in the receptacle via a friction fit when installed in the receptacle.

In various embodiments, the power transmitter includes a console contact positioned in the receptacle to engage a corresponding module contact of the power receiver of the at least one accessory module when the respective module is installed in the receptacle.

In various embodiments, the receptacle is configured to receive a non-powered accessory module such that the power transmitter does not transmit power when the non-powered accessory module is installed in the receptacle.

In various embodiments, the receptacle is one of a plurality of receptacles formed along the console base. Each receptacle is configured for removable attachment of each of the plurality of interchangeable accessory modules such that more than one of the accessory modules is simultaneously powered by the console base when installed in different receptacles.

In various embodiments, the receptacle is one of a plurality of receptacles formed along the console base. Each receptacle is configured for removable attachment of each of the plurality of interchangeable accessory modules, and at least one pair of the accessory modules overlap when installed in different receptacles.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein:

FIG. 4 is a side view of the center console attached to the vehicle and supported by a seat bottom;

FIG. 5 is a side view of the center console attached to the vehicle and supported by a seat backrest; and FIG. 6 is an enlarged cross-sectional view of an accessory module configured for removable attachment in a receptacle of the console.

DESCRIPTION OF ILLUSTRATIVE EMBODIMENTS

Described below is a removable console for use in a secondary row of vehicle seating. The console can be customized via a variety of different accessory modules to provide different functionalities depending on the wants and needs of the adjacent seat occupants. In an era of peer-to-peer ride sharing, in which driver-owned vehicles are used as an alternative to taxis or public transportation, there is a new need for temporary and customizable functionality in vehicle interiors, particularly in rows of seating other than the front row and with an emphasis on electrically powered functions rather than personal storage functions.

Figure 1:
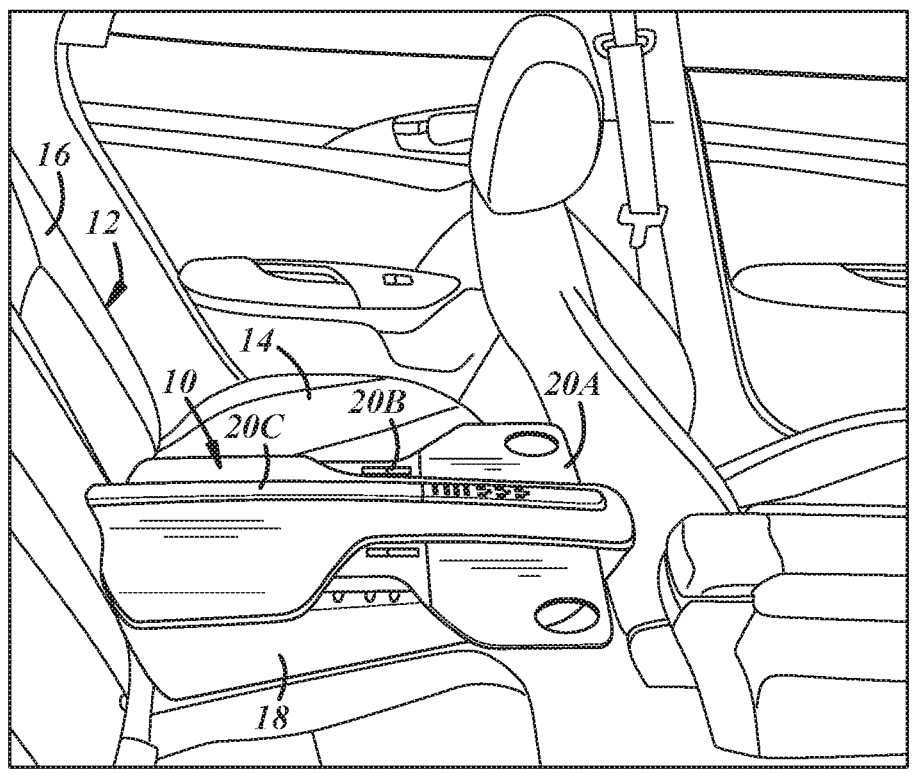
FIG. 1 is a perspective view of an example of a modular center console installed on a second row bench seat in a vehicle passenger cabin.
Figure 2:
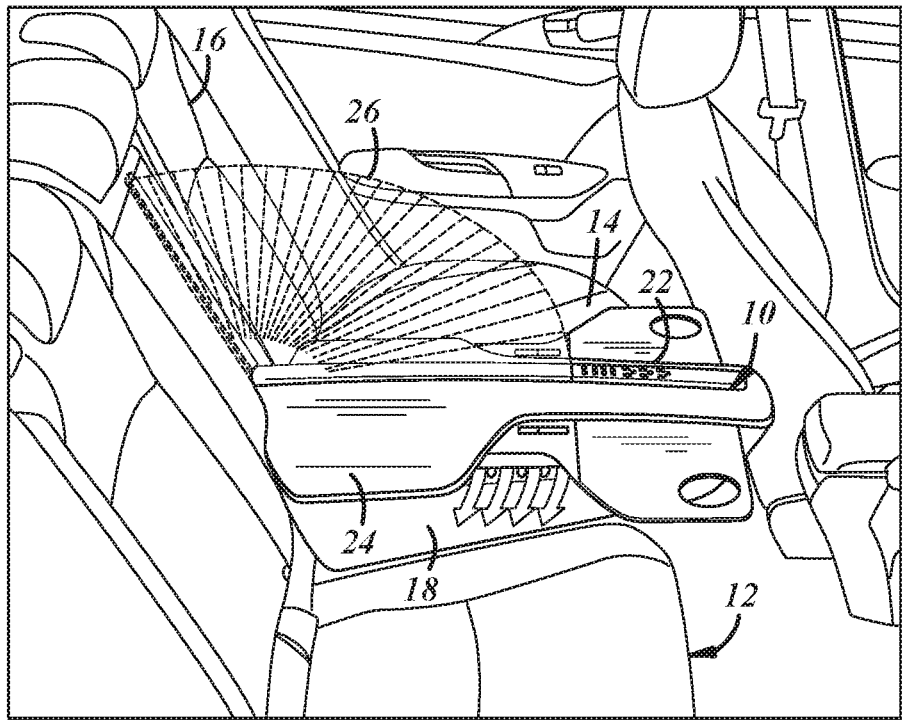
FIG. 2 depicts the center console or FIG. 1 with multiple functions, including deployment of a privacy screen and operation of a climate control module.

With reference to FIGS. 1 and 2, a modular and removable center console 10 is shown installed in a vehicle passenger cabin. In particular, the console 10 is installed between transversely spaced seating positions in a secondary row of seating. As used herein, the transverse direction is a side-to-side direction across the width of the vehicle, and a secondary row of seating is any row other than a front row. The illustrated seat 12 is a bench-style seat with a generally horizontal seat bottom 14 and a generally vertical backrest 16 that define left, right, and central seating positions. The console 10 is vertically spaced above the floor of the vehicle and supported by the seat 12 at the central seating position. In this example, the console 10 is supported above the floor primarily by the seat bottom 14.

The console 10 is configured for removable attachment to the vehicle so that it can be installed or uninstalled as the need arises. Removable attachment can be achieved by numerous means, some of which are described briefly below. As used herein, "removable" means manually removable without damage to the console 10 or to the seat or other vehicle component to which the console is attached. The illustrated configuration, in which the seat 12 is used to space the console above the vehicle floor, places the console at a usable height for adjacent seat occupants while providing the console in a relatively small size that is easily moved in and out of the passenger cabin when necessary—i.e., a floor-mounted console would have to be twice as tall and its larger size would pose related problems as a removable interior component.

The console 10 is modular and includes a base 18 that accommodates interchangeable accessory modules. The console 10 of FIGS. 1 and 2 is illustrated with three accessory modules 20A-20C installed. In the following description, accessory modules are general referred to via reference numeral 20, with specific accessory modules referred as 20A, 20B, etc. as necessary. Each accessory module 20 provides a different function, and some accessory modules may provide more than one different function. As used herein, a functional component of an accessory module 20 is any component that is more than merely a horizontal surface and provides some beneficial utility to an adjacent seat occupant other than aesthetics. Some examples include a cup holder, a storage bin or tray, a control switch, or a phone/tablet holder. Any electrically powered component is also considered a functional component, such as a wireless device charger, a touch screen, or an illumination element.

The console 10 of FIGS. 1 and 2 includes a cup holder module 20A, a climate control module 20B, and a multi-function module 20C. The cup holder module 20A is a non-powered accessory module. The climate control module 20B is a powered accessory module that discharges heated or cooled air toward adjacent seating positions. The multi-function module 20C includes charging/power ports 22 near a forward end, transversely extending armrests 24 near a rearward end, and a deployable privacy screen 26 between the rearward end and the charging/power ports.

Figure 3:
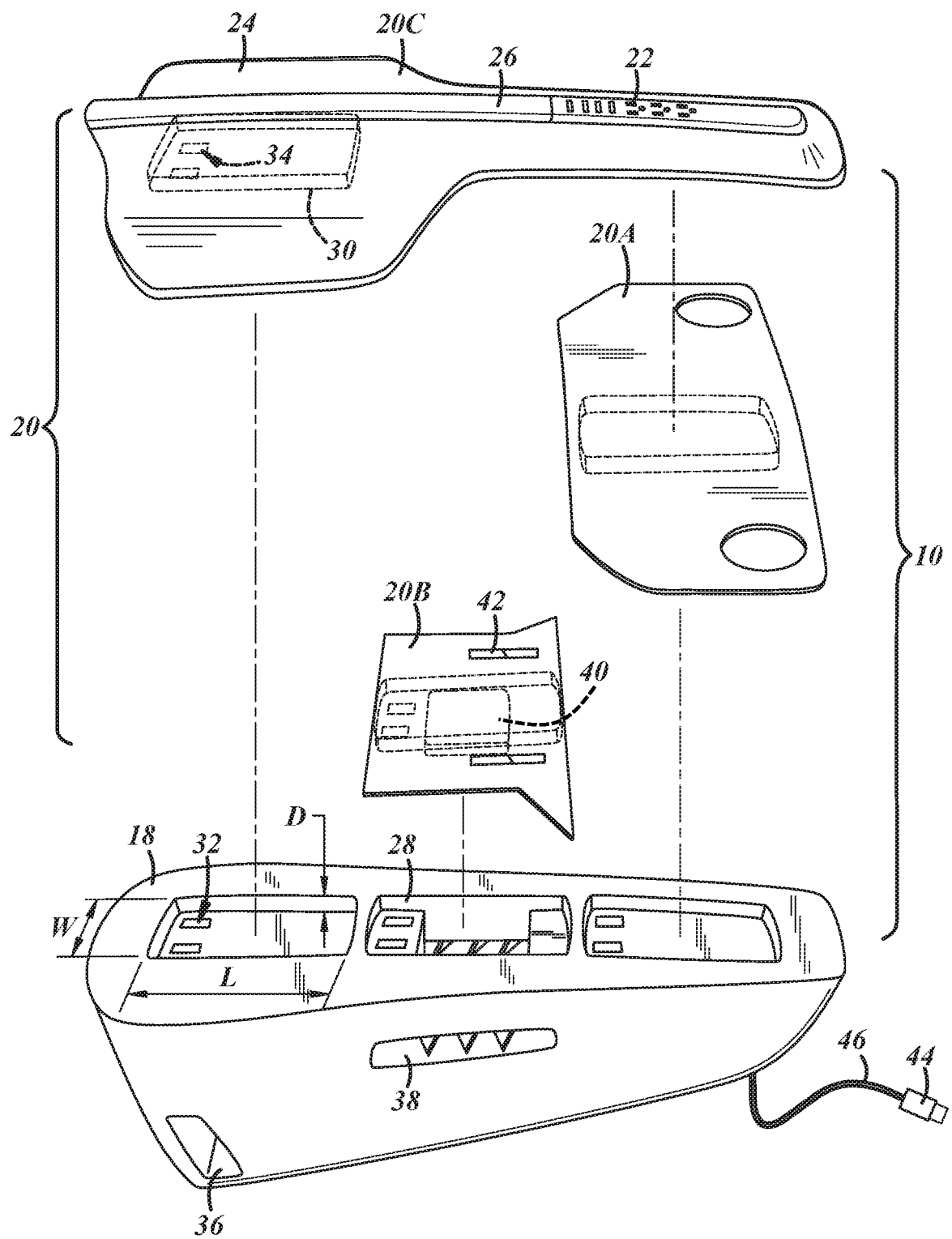
FIG. 3 is an exploded view of the console of FIGS. 1 and 2.

FIG. 3 is an exploded view of the console 10 of FIGS. 1 and 2 separately showing the console base 18 and the three accessory modules 20A-20C. The console 10 includes one or more receptacles 28 formed along the console base 18. In this example, there are three receptacles 28 arranged along a top side of the base 18. Each receptacle 28 is configured for removable attachment of a plurality of different accessory modules 20, only one of which can be installed at one time in any individual receptacle. Here again, "removable" means manually removable without damage to the console base 18 or to the module 20 being removed. Two components are considered to be attached if they stay together while being handled during normal use—i.e., there must be some intent or effort by a user to detach two attached components from each other.

FIG. 3 illustrates the modularity of the console 10, with each accessory module 20 including a mating feature 30 that is shaped and sized to be received in and engaged with any one of the receptacles 28. This means that each receptacle 28 has certain dimensions or features that are identical to each other and that the mating feature 30 of each accessory module has certain dimensions or features that are identical to each other. In this case, a length (L), width (W), depth (D), projected area, and perimeter of each receptacle 28 is the same. A depth of the center receptacle 28 at its lengthwise ends is the same as a uniform depth of the other two receptacles in this example. A power transmitter 32 is included at the same relative location in each one of the receptacles 28. Each illustrated power transmitter 32 is in the form of a pair of electrical contacts, with each pair of electrical contacts having a voltage potential between them. In the example of a vehicle with a DC electrical system, one contact of each pair is provided with a positive voltage and the other contact of each pair is at vehicle ground or zero voltage.

The mating feature 30 of each accessory module 20 is a protrusion provided along a bottom or downward facing side of the respective module. As with the receptacles 28, a length, width, and depth of each protrusion 30 is the same. Powered accessory modules, such as the climate control module 20B or the multi-function module 20C, include a power receiver 34 configured to form an electrical connection between the base 18 and the respective accessory module when that module is installed in any one of the receptacles 28. Each power receiver 34 is provided at the same relative location along the respective mating feature 30. Each power receiver 34 in this example is in the form of a pair of electrical contacts that form electrical connections with the power transmitter 32 of the receptacle 28 in which the accessory module 20 is installed.

The modular features of the console 10 of FIGS. 1-3 are merely illustrative. In particular, the receptacles 28, mating features 30, power transmitters 32, and power receivers 34 may be provided in numerous ways while preserving modularity. For example, the power transmitters 32 and receivers 34 may be configured to form a wireless connection, the transmitters 32 may be located elsewhere along the respective receptacle 28 or base 18, and/or the receivers 34 may be located elsewhere along the mating feature 30 or module 20. The power transmitters and receivers 32, 34 may be in the form of standardized electrical connectors such as USB sockets and plugs. The receptacles 28 may be smaller-sized holes along the console base 18 with appropriately sized posts extending from the modules 20 as the mating features 30.

In this example, the removable attachment of each module 20 is provided via a friction fit along an interface formed between the outer perimeter of each protrusion 30 and the inner perimeter of each receptacle 28. For example, vertical sidewalls of the protrusions 30 and/or the receptacles 28 may be tapered and the mating components may be made from a sufficiently elastic material to hold each module 20 in the respective receptacle 28 once installed. In another example, the modules 20 are magnetically attached to the base 18 via permanent magnets in each module and a ferromagnetic component in the base, or vice versa. In another example, each module includes an electromagnet that is energized once the power transmitters 32 and power receivers 34 form an electrical connection, and the energized electromagnet is attracted to another magnet or a ferromagnetic component in the base 18.

The illustrated modularity permits some swapping of module locations and permits a non-powered module to be installed in powered receptacles. For example, the climate control module 20B could be removed and replaced with the cup holder module 20A in the illustrated example. Certain combinations of accessory modules 20, such as that of FIGS. 1-3, may require the modules to be installed or removed from the base 18 in a particular order. In this example, the multi-function module 20C must be installed after and removed before the other two modules 20A, 20B because the multi-function module overlaps the other modules when all modules are installed. This construction also allows the two forwardmost receptacles 28 to remain empty if desired, while still covering the empty receptacles for a clean aesthetic look. An accessory module such as the multi-function module 20C, which extends over multiple receptacles 28 of the base 18, can also help retain the other underlying accessory modules.

Other features illustrated in the example of FIG. 3 include an attachment feature 36 and vents 38. The illustrated attachment feature 36 is in the form of an opening formed through the console base 18 to provide removable attachment to the vehicle. The lap portion of a seat belt assembly, or some other type of retaining belt or cable, can be fed through the attachment feature and tightened to hold the console 10 securely against the seat bottom 14 and/or backrest 16. The vents 38 are provided to permit air flow into and/or out of the console 10. In this example, each vent 38 provides a fluidic connection between the center receptacle 28 and a location outside the console 10 through a side wall of the console base 18. When the climate control module 20B is installed in the center receptacle 28, heated or cooled air can be discharged from the vents 38 (FIG. 2). In this case, a central portion of the center receptacle 28 is formed deeper than its end portions, and the vents 38 are formed in the deeper portion. The deeper portion of the receptacle 28 can accommodate a heat exchanger 40 (e.g., a resistance heater or a thermoelectric device), and/or a fan to draw air along the heat exchanger and discharge the conditioned air back into the passenger cabin. In this example, the heat exchanger 40 is part of the climate control module 20B, which also includes user controls 42, such as a touch panel or switches.

Electrical power may be provided at the power transmitters 32 via an internal or external power source. In some embodiments, the console 10 includes a power connector 44 configured for electrical coupling with a vehicle power source to provide electrical power at the power transmitters 32. The power connector 44 may be a standardized connector, such as USB, a plug to fit a conventional 12V-DC automotive socket, or a 110V-AC plug, for example. External wiring 46 and/or internal wiring (not shown) electrically interconnect the vehicle or other external power source with the power transmitters 32. In some embodiments, an internal power source such as a rechargeable battery pack is built-in to the console base, and the power connector 44 may be provided to recharge the internal power source. In yet other embodiments, the power source is one of the plurality of accessory modules 20. For example, the respective positive and negative terminals of each of the illustrated pairs of electrical connectors 32 may be in electrical parallel with each other such that a battery pack accessory module can be used to power the other accessory modules if desired.

FIGS. 4 and 5 are side views of different embodiments of the removable console 10 attached to the vehicle via a seat 12 in a secondary row of seating. In the example of FIG. 4, the console 10 is attached to the vehicle by a fastener 48 extending through a bite line 50 of the seat 12. The bite line 50 is defined along the interface of the seat bottom 14 and the backrest 16. Upholstered cushions may come together at the bite line 50 while the underlying frames or structures of the seat bottom 14 and backrest 16 have a gap between them at the same location. The fastener 48 in this case is a quarter-turn fastener, which is shown schematically in FIG. 4. The fastener 48 extends along an axis (A) and includes an arm 52 extending through the bite line 50 to an end portion 54. The end portion 54 is dimensioned to fit through the bite line 50 when in a first rotational orientation (e.g., horizontal) and to not fit through the bite line when in a second rotational orientation (e.g., vertical). The end portion 54 in this case is an elongate member such as a rod. The fastener 48 may be accessed at an end (not shown) opposite the end portion 54 to rotate and selectively engage or disengage the fastener from the seat 12. The opposite end of the fastener may extend into an opening similar to the attachment opening 36 of FIG. 3, for example, or to the forward end of the console base 18 to be accessed by a user. Provisions may be included to tighten or provide tension along the fastener 48, such as threads or a rachet mechanism. Other types of fasteners are possible.

The console 10 of FIG. 5 is attached to the vehicle such that the backrest 16 supports the console 10 over the seat bottom 14 of the vehicle seat 12. In particular, the console 10 includes an attachment arm 52' extending from a rear end of the console base 18. The attachment arm 52' is configured to extend along the backrest 16 and over the top end of the backrest to attach the console 10 to the seat 12. The console base 18 is thus supported as a cantilever extending from the backrest 16 and vertically spaced from the seat bottom 14. An end portion 54' of the attachment arm 52' may be configured in the manner of a quarter-turn fastener as in the example of FIG. 4. The end portion 54' may be a rod or other elongate member, for example, that fits through an interface 50' between the backrest 16 and a headrest 56 when in a first orientation (e.g., horizontal), but does not fit through the interface 50' when rotated to the illustrated second orientation (e.g., vertical). A user can access the rotatable end portion 54' along the back side of the headrest 56. In other examples, the attachment arm 52' can be made to attach to a tether or anchor along the top side of the back rest that is conventionally provided for attachment of child safety seats.

Each of the examples of FIGS. 4 and 5 are illustrated receiving three accessory modules 20A-20C. As in the previous example, the consoles 10 of FIGS. 4 and 5 are modular with the mating feature 30 of each module having dimensions identical to the others and each receptacle 28 having dimensions identical to the others. In this case, each module 20 also has the same overall length such that all of the modules are interchangeable with each other. For example, any one of the modules 20A, 20B, 20C could be installed in any of the three receptacles in any order.

FIG. 6 is a cross-sectional view of a portion of the modular console 10 illustrating another manner of removable attachment of the accessory modules 20. The illustrated module 20 is a power/charging module to provides powered USB ports. Such ports could also be provided for connectivity to another one of the accessory modules or to an in-vehicle entertainment center, for example. The console 10 includes a latch 58 that holds the installed accessory module 20 in the receptacle 28. The latch 58 extends through an opening along a sidewall of the receptacle 28 and is biased in the direction of extension. An actuator 60 is provided to move the latch 58 against the spring or other biasing element to permit the installed accessory module 20 to be removed, once installed.

To install the module 20 in the receptacle 28 from an uninstalled position above the receptacle, the module is lowered toward the receptacle. The relative dimensions of the receptacle 28 and module, in particular their relative perimeters, are a non-friction fit—i.e., there is no dimensional interference along the respective perimeters. A bottom side of a latch plate 62 of the accessory module 20 contacts a cam surface 64 of the latch 58, which moves the latch against the biasing force (i.e., to the right in FIG. 6). When the module 20 is lowered completely into the receptacle 28 such that the latch plate 62 has moved beyond the cam surface 64 of the latch, the biasing force moves the latch over the top side of the latch plate 62, thereby attaching the module 20 to the console base 18 and retaining it in the receptacle 28. To remove or detach the module 20, the actuator 60 is used to move the latch 58 against the biasing force until the end of the latch clears the latch plate 62, after which the module is free to be lifted from the receptacle 28. An additional biasing element may be provided along the bottom of the module 20 or receptacle 28 to help push the module away from the receptacle once the latch 58 is actuated.

In this example, the actuator 60 is in the form of a lever or tab that extends through an opening in the console base 18 adjacent the receptacle 28 to be manually accessed by a user. Other types of actuators may be employed to move the latch 58 and install or uninstall one of the modules 20, such as solenoids or other electrically powered mechanisms. Other types of manual actuators may also be used, such as handle/cable/pulley systems.

Another feature of the embodiment of FIG. 6 is that the power transmitter 32 is located along the latch 58. As in the example of FIG. 3, the power transmitter 32 in this case is in the form of a pair of electrical contacts 66, and the power receiver 34 is in the form of a corresponding pair of electrical contacts 68. The electrical contacts 66 of the console base 18 may be referred to as console contacts, and the electrical contacts 68 of the modules 20 may be referred to as module contacts. In this implementation, an electrical connection is formed between the base 18 and one of the plurality of available modules 20 when one of the modules is installed in the receptacle and the latch 58 retains the module 20 by its latch plate 62. The power transmitter 32 along the receptacle is thereby biased toward the power receiver 34 of the installed module 20, and the electrical connection is broken or interrupted when the latch 58 is actuated to uninstall the module 20. The power transmitter and receiver 32, 34 may be located elsewhere in corresponding positions along the receptacle 28, base 18, or module 20. In other embodiments, removable attachment of the modules 20 to the base is provided by the latch 58 and the power transmitter 32 is located away from the latch.

Another manner of removable attachment of the modules 20 to the receptacles 28 includes quarter-turn fasteners. A quarter-turn fastener includes an elongate member perpendicular to the axis of rotation that fits through a slot or other opening in the mating component in only one orientation and is then rotated so that the elongate member cannot pass back through the opening without re-alignment. A quarter-turn fastener may alternatively include an eccentric element that can move past an edge of a mating component when in a first orientation but cannot move past the same edge when rotated to a second orientation.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A console for use in a passenger cabin of a vehicle, the console comprising:
   a console base configured for removable attachment in the passenger cabin of the vehicle;
   a plurality of receptacles formed along the console base, each receptacle being configured for removable attachment of a plurality of interchangeable accessory modules, wherein the plurality of interchangeable accessory modules includes: a powered accessory module having a power receiver, and a non-powered accessory module; and
   a plurality of power transmitters, each power transmitter being located along a different one of the receptacles and configured to provide electrical power from the console base to the powered accessory module via the power receiver when the powered accessory module is installed in any one of the receptacles,
   and
   wherein each receptacle is also configured to receive the non-powered accessory module such that the respective power transmitter does not transmit power when the non-powered accessory module is installed in any one of the receptacles.

2. The console of claim 1, further comprising a latch that holds an installed one of the accessory modules in the respective receptacle and an actuator that moves the latch to permit the installed accessory module to be removed.

3. The console of claim 2, wherein the latch is biased toward a position that holds the installed accessory module in the receptacle.

4. The console of claim 2, wherein the latch is located along the receptacle.

5. The console of claim 1, wherein the each power transmitter is located along a latch that holds an installed one of the accessory modules in the respective receptacle.

6. The console of claim 1, further comprising a power connector configured for electrical coupling the console base with a vehicle power source to provide electrical power at the power transmitter when the console base is attached to the vehicle.

7. The console of claim 1, wherein the console base is supported by a vehicle seat when attached to the vehicle.

8. The console of claim 7, wherein the console base is attached to the vehicle by a fastener extending through a bite line of the vehicle seat.

9. The console of claim 1, wherein the console attaches to the vehicle such that a backrest of a vehicle seat supports the console over a seat bottom of the vehicle seat.

10. The console of claim 9, further comprising an attachment arm extending from the console base, wherein the attachment arm is configured to extend along the backrest and over a top end of the backrest to attach the console to the vehicle seat.

11. The console of claim 1, wherein each accessory module is held in the receptacle via a friction fit when installed in one of the receptacles.

12. The console of claim 1, wherein each power transmitter comprises a console contact positioned in the receptacle to engage a corresponding module contact of the power receiver of the powered accessory module when the powered accessory module is installed in any one of the receptacles.

13. The console of claim 1, wherein more than one of the accessory modules is simultaneously powered by the console base when installed in different receptacles.

14. A console for use in a passenger cabin of a vehicle, the console comprising:
  a console base configured for removable attachment in the passenger cabin of the vehicle;
  a receptacle formed along the console base and configured for removable attachment of a plurality of interchangeable accessory modules; and
  a power transmitter for providing electrical power from a power source to an installed one of the accessory modules,
  wherein at least one of the interchangeable accessory modules comprises a power receiver for receiving electrical power from the power source when installed in the receptacle, and
  wherein the receptacle is one of a plurality of receptacles formed along the console base, each receptacle being configured for removable attachment of each of the plurality of interchangeable accessory modules, and wherein at least one pair of the accessory modules overlap when installed in different receptacles.

15. The console of claim 1, further comprising a latch that holds an installed one of the accessory modules in the receptacle and an actuator that moves the latch to permit the installed accessory module to be removed.

16. The console of claim 1, further comprising a power connector configured for electrical coupling with a vehicle power source to provide electrical power at the power transmitter.

17. The console of claim 1, wherein the console base is supported by a vehicle seat when attached to the vehicle.

18. The console of claim 1, wherein each accessory module is held in the receptacle via a friction fit when installed in the receptacle.

19. The console of claim 1, wherein the power transmitter comprises a console contact positioned in the receptacle to engage a corresponding module contact of the power receiver of the at least one accessory module when the respective module is installed in the receptacle.

20. The console of claim 1, wherein the receptacle is one of a plurality of receptacles formed along the console base, each receptacle being configured for removable attachment of each of the plurality of interchangeable accessory modules such that more than one of the accessory modules is simultaneously powered by the console base when installed in different receptacles.

* * * * *